United States Patent
Mu et al.

(10) Patent No.: US 10,952,197 B2
(45) Date of Patent: Mar. 16, 2021

(54) METHOD FOR DETERMINING HYBRID AUTOMATIC REPEAT REQUEST PROCESS NUMBER, BASE STATION, AND USER EQUIPMENT

(71) Applicant: NTT DOCOMO INC., Tokyo (JP)

(72) Inventors: Qin Mu, Beijing (CN); Liu Liu, Beijing (CN); Huiling Jiang, Beijing (CN); Naoto Okubo, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 55 days.

(21) Appl. No.: 16/324,477

(22) PCT Filed: Aug. 10, 2017

(86) PCT No.: PCT/CN2017/096718
§ 371 (c)(1),
(2) Date: Feb. 8, 2019

(87) PCT Pub. No.: WO2018/028617
PCT Pub. Date: Feb. 15, 2018

(65) Prior Publication Data
US 2019/0215810 A1    Jul. 11, 2019

(30) Foreign Application Priority Data
Aug. 11, 2016  (CN) .......... 201610658522.X

(51) Int. Cl.
*H04W 72/04* (2009.01)
*H04L 5/00* (2006.01)
*H04L 1/18* (2006.01)

(52) U.S. Cl.
CPC ......... *H04W 72/042* (2013.01); *H04L 1/1812* (2013.01); *H04L 5/00* (2013.01)

(58) Field of Classification Search
None
See application file for complete search history.

(56) References Cited

U.S. PATENT DOCUMENTS

| | | | | |
|---|---|---|---|---|
| 2012/0218882 | A1* | 8/2012 | Ko | H04B 7/0626 370/216 |
| 2014/0126517 | A1* | 5/2014 | Choi | H04L 5/0073 370/329 |
| 2018/0254860 | A1* | 9/2018 | Wong | H04L 1/1887 |

FOREIGN PATENT DOCUMENTS

| | | |
|---|---|---|
| CN | 101562511 A | 10/2009 |
| CN | 101989901 A | 3/2011 |

(Continued)

OTHER PUBLICATIONS

International Search Report regarding PCT/CN2017/096718, dated Oct. 26, 2017.

(Continued)

*Primary Examiner* — Yaotang Wang
(74) *Attorney, Agent, or Firm* — Osha Bergman Watanabe & Burton LLP

(57) ABSTRACT

Disclosed are a method for determining a hybrid automatic repeat request (HARQ) process number (HPN) allocated to downlink link (DL) data, a method for notifying a HPN allocated to the DL data, a method for allocating a HPN to DL data, a base station, and a user equipment. The method for determining a HPN allocated to DL data includes: receiving DL control information (DCI) associated with DL data; determining, according to the DCI, whether the DL data satisfies a predetermined condition; and when the DL data satisfies the predetermined condition, determining the HPN allocated to the DL data based on a HPN field and an additional field in the DCI. Alternatively, the method for determining a HPN allocated to DL data includes: receiving DCI related to current DL data; determining whether HPN (Continued)

fields in the DC are predetermined values indicating at least a first HPN and a second HPN; and when it is determined that the HPN fields are predetermined values, determining a HPN allocated to the current DL data, according to a reception state of DL data sent before the current DL data. Accordingly, overheads and power consumption are not increased while more than 8 HARQ processes are supported.

12 Claims, 6 Drawing Sheets

(56) References Cited

FOREIGN PATENT DOCUMENTS

| CN | 101990242 A | 3/2011 |
|---|---|---|
| CN | 102394728 A | 3/2012 |
| CN | 103199965 A | 7/2013 |
| CN | 104079395 A | 10/2014 |

OTHER PUBLICATIONS

International Preliminary Report on Patentability regarding PCT/CN2017/096718, including the English translation of the Written Opinion, dated Feb. 12, 2019.
Partial Supplementary European Search Report from counterpart EP17838747.8, dated Mar. 5, 2020.
Nokia Networks, "DCI Design for MTC", R1-155135, 3GPP TSG-RAN WG1 Meeting #82bis, Malmo Sweden, Oct. 5-9, 2015.
NTT DOCOMO, "DCI design for Rel-13 low complexity MTC", R1-155922, 3GPP TSG RAN WG1 Meeting #82bis, Malmo, Sweden, Oct. 5-9, 2015.
Extended European Search Report in counterpart European Application No. 17838747.8 dated Aug. 6, 2020 (17 pages).
Sony; "Achieving Peak DL Throughput for eMTC"; 3GPP TSG-RAN WG1 Meeting #83, R1-156692; Anaheim, USA; Nov. 15-21, 2015 (9 pages).
Qualcomm Incorporated; "Clarification of UL HARQ Handling"; 3GPP TSG-RAN2 Meeting #94, R2-164238; Nanjing, China; May 23-27, 2016 (2 pages).

* cited by examiner

| Subframe NO. | 0 | 1 | 2 | 3 | 4 | 5 | 6 | 7 | 8 | 9 | 0 | | |
|---|---|---|---|---|---|---|---|---|---|---|---|---|---|
| PDCCH | #8 (1000) | #7 (0111) | #6 (0110) | #5 (0101) | #4 (0100) | #3 (0011) | #2 (0010) | #1 (001) | -- | #0 (000) | -- | | |
| PDSCH | | | #8 | #7 | #6 | #5 | #4 | #3 | #2 | #1 | #1 | #0 | #0 |

METHOD FOR DETERMINING HYBRID AUTOMATIC REPEAT REQUEST PROCESS NUMBER, BASE STATION, AND USER EQUIPMENT

CROSS-REFERENCE TO RELATED APPLICATIONS

This application is a 371 U.S. National Stage of International Application No. PCT/CN2017/096718, filed on Aug. 10, 2017, which claims priority to Chinese Application No. 201610658522.X, filed on Aug. 11, 2016. The entire disclosures of the above applications are incorporated herein by reference.

TECHNICAL FIELD

The present disclosure relates to hybrid automatic repeat request (HARQ), and particularly relates to a method for allocating an HARQ process number (HPN) to downlink data, a method for determining an HARQ process number allocated to downlink data, a method for notifying an HARQ process number allocated to downlink data, and a corresponding user equipment and base station.

BACKGROUND

In the Third Generation Partnership Project (3GPP) standard Rel. 13, evolved Machine-To-machine Communication (eMTC) supports the same HARQ mechanism as a Long Term Evolution (LTE) system. In particular, eMTC supports up to 8 HARQ processes, and indicates, in Downlink Control Information (DCI), an HPN allocated to data associated with the DCI (e.g., Physical Downlink Shared Channel (PDSCH)) by a HARQ process number (HPN) field with 3 bits. However, an eMTC system utilizes a different scheduling mode from a LTE system. That is, in an eMTC system, a PDSCH is transmitted on the second valid subframe after transmission of a Physical Downlink Control Channel (MPDCCH) is finished, and since the Round Trip Time (RTT) from transmission of the PDSCH to reception of feedback information for the PDSCH in the eMTC system is 10 ms, the eMTC system actually has the ability to support at least 10 parallel HARQ processes.

Therefore, in an MTC system of the 3GPP standard Rel. 14, it is desirable that at least 10 HARQ processes can be supported to improve data transmission rate. However, a 3-bit HPN field in DCI of the 3GPP standard Rel. 13 can only represent 8 HPNs at most. Thus, for the system supporting at least 10 HARQ processes, a method for allocating an HPN to downlink data and notifying the allocated HPN, and a method for determining, by a UE, an HPN allocated to a PDSCH are needed.

SUMMARY

According to an embodiment of the present disclosure, it is provided a method for determining a hybrid automatic repeat request (HARQ) process number allocated to downlink data, the method comprising: receiving downlink control information associated with the downlink data; determining, according to the downlink control information, whether the downlink data satisfies a predetermined condition; when the downlink data satisfies the predetermined condition, determining an HARQ process number allocated to the downlink data according to an HARQ process number field and an additional field in the downlink control information.

According to another embodiment of the present disclosure, it is provided a method for determining a hybrid automatic repeat request (HARQ) process number allocated to current downlink data, the method comprising: receiving downlink control information associated with the current downlink data; determining whether an HARQ process number field in the downlink control information is a predetermined value indicating at least a first HARQ process number and a second HARQ process number; when it is determined that the HARQ process number field is the predetermined value, determining an HARQ process number allocated to the current downlink data according to a reception state of downlink data transmitted before the current downlink data.

According to another embodiment of the present disclosure, it is provided a method for notifying a hybrid automatic repeat request (HARQ) process number allocated to downlink data, the method comprising: determining whether the downlink data satisfies a predetermined condition; when the downlink data satisfies the predetermined condition, notifying the HARQ process number allocated to the downlink data with an HARQ process number field and an additional field in downlink control information.

According to another embodiment of the present disclosure, it is provided a method for allocating a hybrid automatic repeat request (HARQ) process number to current downlink data, the method comprising: determining a reception state of downlink data transmitted before the current downlink data; and allocating a first HARQ process number or a second HARQ process number to the current downlink data based on the reception state, wherein both the first HARQ process number and the second HARQ process number are represented with a predetermined value of an HARQ process number field in downlink control information.

According to another embodiment of the present disclosure, it is provided a user equipment, the user equipment comprising: a receiving unit, configured to receive downlink control information associated with downlink data; a determining unit, configured to determine, according to the downlink control information, whether the downlink data satisfies a predetermined condition, and when the downlink data satisfies the predetermined condition, determine an HARQ process number allocated to the downlink data according to an HARQ process number field and an additional field in the downlink control information.

According to another embodiment of the present disclosure, it is provided a user equipment, the user equipment comprising: a receiving unit, configured to receive downlink control information associated with current downlink data; a determining unit, configured to determine whether an HARQ process number field in the downlink control information is a predetermined value representing at least a first HARQ process number and a second HARQ process number, and when it is determined that the HARQ process number field is the predetermined value, determine an HARQ process number allocated to the current downlink data according to a reception state of downlink data transmitted before the current downlink data.

According to another embodiment of the present disclosure, it is provided a base station, the base station comprising: a determining unit, configured to determine whether the downlink data satisfies a predetermined condition; a notifying unit, configured to notify an HARQ process number allocated to the downlink data with an HARQ process number field and an additional field in downlink control information, when the downlink data satisfies the predetermined condition.

According to another embodiment of the present disclosure, it is provided a base station, the base station comprising: a determining unit, configured to determine a reception state of downlink data transmitted before current downlink data; and a allocating unit, configured to allocate a first HARQ process number or a second HARQ process number to the current downlink data according to the reception state, wherein both the first HARQ process number and the second HARQ process number are represented with a predetermined value of an HARQ process number field in downlink control information.

BRIEF DESCRIPTION OF THE DRAWINGS

The foregoing and other objects, features and advantages of the present disclosure will become more apparent from the detailed description of the embodiments of the present disclosure in conjunction with the accompanying drawings. The drawings are included to provide a further understanding of the embodiments of the present disclosure, constitute a part of this specification, and help to explain the present disclosure together with the embodiments of the present disclosure, but are not intended as a limitation of the present disclosure. In the drawings, same reference labels usually indicate same components or steps.

DETAILED DESCRIPTION

In order to make the objectives, technical solutions and advantages of the present disclosure more apparent, exemplary embodiments according to the present disclosure will be described in detail below, with reference to the drawings. Apparently, the described embodiments are only a part but not all of the embodiments of the present disclosure. It should be understood that the present disclosure is not limited by the exemplary embodiments described herein. All other embodiments obtained by a person skilled in the art based on the embodiments of the present disclosure described herein without creative effort are intended to fall within the scope of the present disclosure.

Figure 1:
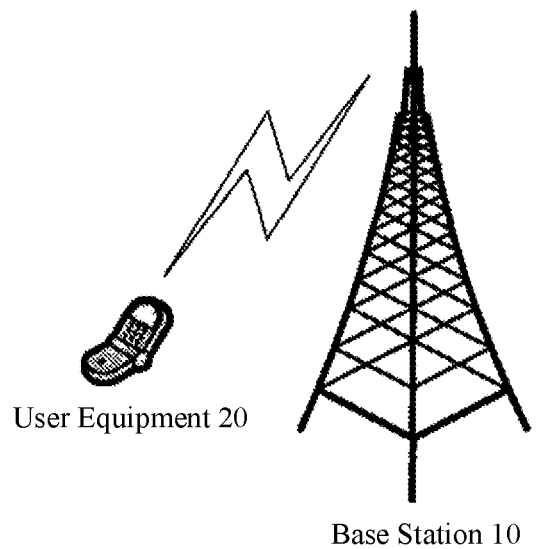
FIG. 1 is a schematic diagram illustrating an evolved machine-to-machine communication (MTC) system to which the embodiments of the present disclosure can be applied.

FIG. 1 is a schematic diagram illustrating an evolved machine-to-machine communication (MTC) system to which embodiments of the present disclosure can be applied. As illustrated in FIG. 1, the system includes a base station (eNB) 10 and a user equipment (UE) 20, in which the base station 10 transmits a control signal and data to the user equipment 20, and the user equipment 20 receives and detects the control signal and downlink data and transmits feedback information for the data (HARQ feedback information) to the base station. The feedback information may be positive acknowledgment information (ACK) indicating that the data is successfully received or negative acknowledgment information (NACK) indicating that the data is not successfully received. The control signal may be, for example, a physical downlink control channel (PDCCH or mPDCCH (i.e. a PDCCH used in an MTC system)), and the downlink data may be, for example, a physical downlink shared channel (PDSCH). Description will be made below with PDCCHs and PDSCHs as examples of control signals and downlink data, which is merely illustrative, since the control signals and downlink data may also be other types of control signals and data. Furthermore, it should be noted that although only one base station and one UE are illustrated in FIG. 1, this is merely illustrative, and there may be multiple base stations and/or UEs in the system.

In an eMTC system, as well known in the art, for example, a PDSCH transmitted to the UE may be repeatedly transmitted multiple times by the base station to ensure that the UE can receive the PDSCH properly in case of poor channel quality between the base station and the UE. Accordingly, a PDSCH repetition field is set in DCI to indicate the repetition number of the PDSCH. Furthermore, the first transmitted PDSCH may be transmitted in a first frequency band when the repetition number of the PDSCH is greater than 1, and the retransmitted PDSCH is transmitted in a different second frequency band, that is, the PDSCH to be repeatedly transmitted is transmitted by frequency hopping. Accordingly, a 1-bit frequency hopping field is set in the DCI to indicate whether the PDSCH transmitted repeatedly is transmitted by frequency hopping. In addition to the fields described above, the DCI further includes a resource allocation field for indicating a frequency resource block allocated for the PDSCH. The resource allocation field has 5 bits.

Various embodiments of the present disclosure will be described below with reference to the drawings. The embodiments may be applied in systems supporting more than 8 HARQ processes (e.g., eMTC systems). Various embodiments will be described below by taking an eMTC system supporting 10 HARQ processes as an example, but this is not limitative, and various embodiments of the present disclosure may be applied in other systems supporting other number of HARQ processes.

First Embodiment

In a first embodiment of the present disclosure, a base station may allocates, for example, 10 HARQ processes to a PDSCH to be transmitted to a UE. Since an HPN field in DCI has only 3 bits, which can only indicate 8 HARQ process numbers at most, redundant fields in addition to the HPN field in the DCI are selectively used to indicate an HPN allocated to the PDSCH in the first embodiment to solve this problem.

In an eMTC system, for the reason that the round trip time of one PDSCH transmission is 10 ms (10 subframes), and that the corresponding PDSCH is transmitted on the second subframe subsequent to a PDCCH, it is required that at least 6 (=10-2-1-1) PDSCHs are not repeatedly transmitted to use 8 or more PDSCH processes, that is, the repetition number of at least 6 PDSCHs is 1. For PDSCHs with repetition number of 1, it is not necessary to transmit the PDSCHs by frequency hopping, and therefore frequency hopping fields in the DCI do not need to indicate whether there is frequency hopping, which accordingly becomes redundant fields. In this case, HPNs greater than 8 may be allocated to one or more of the 6 PDSCHs with repetition number of 1, and the HPNs greater than 8 may be represented with HPN fields and the frequency hopping fields. For PDSCHs with repetition numbers greater than 1, HPNs less than or equal to 8 may be allocated, and the HPNs are represented with only HPN fields A method for notifying an HPN allocated to a PDSCH according to the first embodiment of the present disclosure will be described below with reference to FIG. 2, which may be executed at the base station.

Figure 2:
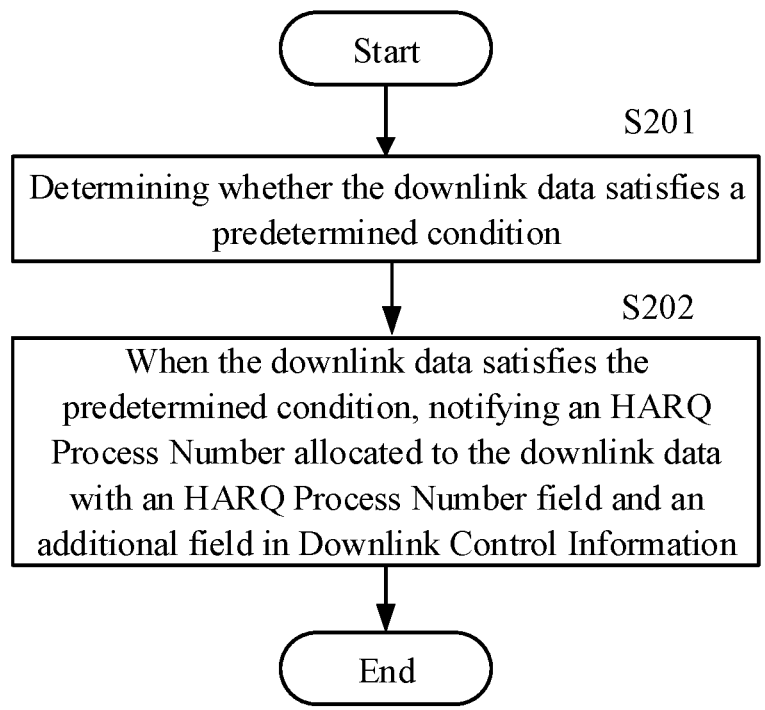
FIG. 2 is a flow chart illustrating a method for notifying an HARQ process number allocated to downlink data according to a first embodiment of the present disclosure.

As illustrated in FIG. 2, at step S201, whether the PDSCH satisfies a predetermined condition may be determined. In the embodiment, the predetermined condition may means that the repetition number of the PDSCH is 1. For example, the base station may determine whether the PDSCH satisfies the predetermined condition by determining whether the repetition number for the PDSCH is set to 1.

Next, at step S202, an HPN allocated to the PDSCH is notified with an HPN field and an additional field in DCI when the PDSCH satisfies the predetermined condition.

In particular, a frequency hopping field in the DCI indicating whether to transmit the PDSCH by frequency hopping becomes a redundant field as described above when the repetition number of the PDSCH is 1, and therefore the frequency hopping field may be used as an additional field for representing and notifying the HPN allocated to the PDSCH, that is, both the HPN field and the frequency hopping field are used to represent and notify the HPN allocated to the PDSCH. In particular, the HPN allocated to the PDSCH may be notified with a value obtained by combining the HARQ process number field and the frequency hopping field. For example, a 1-bit A of the frequency hopping field and a 3-bit BBB of the HPN field may be cascaded as an ABBB, such that HPN#0-HPN#7 may be represented when A=0 and HPN#8-HPN#15 may be represented when A=1. It should be appreciated that the manner of combining the HARQ process number field and the frequency hopping field may be flexibly selected according to actual requirements. For example, the frequency hopping field may be the most significant bit of the combined field as described above, or may be the least significant bit or some bit in the middle of the combined field.

On the other hand, when it is determined that the PDSCH does not satisfy the predetermined condition, i.e., the repetition number of the PDSCH is greater than 1, the PDSCH may be repeatedly transmitted by frequency hopping as described above, in which case the frequency hopping field will indicate that whether to transmit the PDSCH by frequency hopping, instead of being redundant. In this case, the HPN allocated to the PDSCH is notified with only an HPN field in the DCI. In this case, the HPN field may represent HPN#0-HPN#7.

Figures 3, 4:
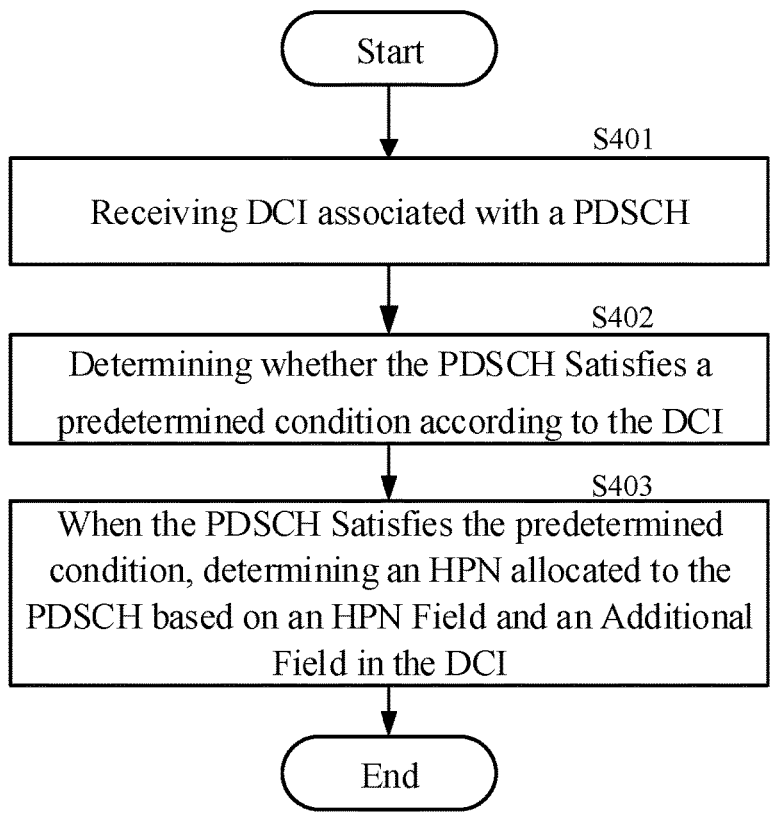
FIG. 3 illustrates an example of allocating an HARQ process number to downlink data and notifying the allocated HARQ process number according to the first embodiment of the present disclosure.
FIG. 4 is a flow chart illustrating a method for determining an HARQ process number allocated to downlink data according to the first embodiment of the present disclosure.

FIG. 3 illustrates an example of allocating an HPN to a PDSCH and notifying the allocated HPN according to the first embodiment of the present disclosure. As illustrated in FIG. 3, since the repetition number of PDSCHs scheduled by PDCCH#1 and PDCCH#0 is 2, and all the repetition number of PDSCHs scheduled by PDCCH#2-PDCCH#8 is 1, the HPN allocated to the PDSCH may be represented by 4 bits (1 bit of the frequency hopping field and 3 bits of the HPN field) in DCI of PDCCH#2-PDCCH#8, or by 3 bits of the HPN field in DCI of PDCCH#1 and PDCCH#0.

A method for determining an HPN allocated to downlink data (still taking a PDSCH as an example) according to the first embodiment of the present disclosure will be described below with reference to FIG. 4. The method may be performed by a UE.

As illustrated in FIG. 4, at step S401, downlink control information (DCI) associated with the PDSCH is received. In particular, a PDCCH (mPDCCH) transmitted from a base station used to schedule the PDSCH may be received, and the DCI may be extracted from the PDCCH.

Next, at step S402, whether the PDSCH satisfies a predetermined condition is determined according to the DCI. In this embodiment, the predetermined condition is that the repetition number of downlink data indicated by the DCI is 1, as described above. For example, the UE may read the repetitive field of the PDSCH in the DCI to determine whether the repetition number of the PDSCH is 1, thereby determining whether the PDSCH satisfies the predetermined condition.

Next, at step S403, an HPN allocated to the PDSCH is determined based on an HPN field and an additional field in the DCI when the PDSCH satisfies the predetermined condition. As described above, when the PDSCH satisfies the predetermined condition, i.e., the repetition number of the PDSCH is 1, a frequency hopping field in the DCI is redundant, such that the HPN allocated to the PDSCH is represented by the base station with the HPN field and the frequency hopping field. That is, the additional field is the frequency hopping field in the DCI. Accordingly, on the UE side, the HPN allocated to the PDSCH may be determined based on the HPN field and the additional field in the DCI. For example, the HPN field and the frequency hopping field may be combined, and the HPN allocated to the PDSCH may be determined based on the combined value. The manner of combining the HPN field and the frequency hopping field may be, for example, predefined between the UE and the base station, or signaled to the UE by the base station such that the UE may combine the fields in the same manner as the base station.

On the other hand, when the PDSCH does not satisfy the predetermined condition, the HPN allocated to the PDSCH may be determined based on an HPN field in the DCI. In particular, when the repetition number of PDSCH is greater than 1, the HPN allocated to the PDSCH is represented by the base station using only the HPN field in the DCI, as described above, and therefore in the UE the HPN allocated to the PDSCH may be determined by reading the HPN.

A base station according to the first embodiment of the present disclosure will be described below with reference to FIG. 5, which may execute the method described above with reference to FIG. 2. The same content as the above method will not be described here to avoid repetition.

Figure 5:
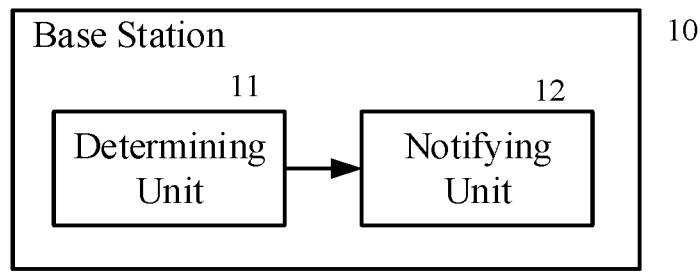
FIG. 5 is a block diagram illustrating a base station according to the first embodiment of the present disclosure.

As illustrated in FIG. 5, the base station 10 includes a determining unit 11 and a notifying unit 12. It should be noted that only two units closely related to the present disclosure in the base station are illustrated herein for the sake of simplicity, but this is merely illustrative. The base station may further include other units as needed.

The determining unit 11 may determine whether the PDSCH satisfies a predetermined condition. In this embodiment, the predetermined condition may be that the repetition number of the PDSCH is 1. For example, the determining unit 11 may determine whether the PDSCH satisfies the predetermined condition by determining whether the repetition number for the PDSCH is set to 1.

The notifying unit 12 may notify an HPN allocated to the PDSCH with an HPN field and an additional field in DCI when the PDSCH satisfies the predetermined condition. In particular, as described above, a frequency hopping field in the DCI becomes a redundant field when the repetition number of the PDSCH is 1, which may be regarded as an additional field. In this case, the notifying unit 12 may represent and notify the HPN allocated to the PDSCH using both the HPN field and the frequency hopping field. In particular, the notifying unit 12 may notify the HPN allocated to the PDSCH with a value obtained by combining the HARQ process number field and the frequency hopping field. The manner of combining the HARQ process number field and the frequency hopping field may be flexibly selected according to actual requirements. On the other hand, when it is determined that the PDSCH does not satisfy the predetermined condition, i.e., the repetition number of the PDSCH is greater than 1, the notifying unit 12 may notify the HPN allocated to the PDSCH with the HPN field in the DCI.

A UE according to the first embodiment of the present disclosure will be described below with reference to FIG. 6. The UE may execute the method described above with reference to FIG. 3. The same content as the above method will not be described here to avoid repetition.

Figure 6:
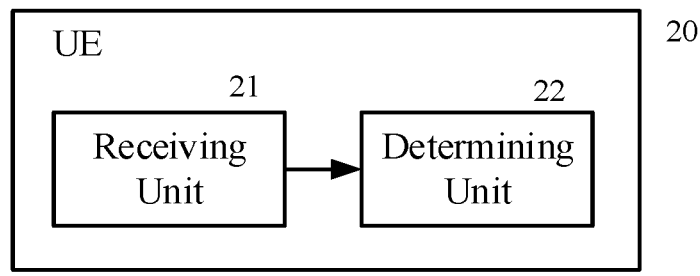
FIG. 6 is a block diagram illustrating a UE according to the first embodiment of the present disclosure.

As illustrated in FIG. 6, the UE 20 includes a receiving unit 21 and a determining unit 22. It should be noted that only two units closely related to the present disclosure in the UE are illustrated herein for the sake of simplicity, but this is merely illustrative. The UE may further include other units as needed.

The receiving unit 21 may receive downlink control information (DCI) associated with the PDSCH. In particular, the receiving unit 21 may receive a PDCCH (mPDCCH) transmitted from the base station used to schedule the PDSCH, and extract the DCI from the PDCCH.

The determining unit 22 may determine whether the PDSCH satisfies a predetermined condition according to the DCI. In this embodiment, the predetermined condition is that the repetition number of the downlink data indicated by the DCI is 1. For example, the determining unit 22 may read the repetitive field of the PDSCH in the DCI to determine whether the repetition number of the PDSCH is 1, thereby determining whether the PDSCH satisfies the predetermined condition.

Furthermore, the determining unit 22 may determine an HPN allocated to the PDSCH based on an HPN field and an additional field in the DCI when the PDSCH satisfies the predetermined condition. As described above, when the PDSCH satisfies the predetermined condition, i.e., the repetition number of the PDSCH is 1, a frequency hopping field in the DCI is redundant, and thus can be used as an additional field representing the HPN allocated to the PDSCH so that the base station can use the HPN field and the additional field to represent the HPN allocated to the PDSCH. Accordingly, on the UE side, the determining unit 22 may determine the HPN allocated to the PDSCH based on the HPN field and the additional field in DCI. For example, the determining unit 22 may combine the HPN field and the frequency hopping field, and determine the HPN allocated to the PDSCH based on the combined value. The manner of combining the HPN field and the frequency hopping field may be, for example, predefined between the UE and the base station, or signaled to the UE by the base station such that the determining unit 22 may combine the fields in the same manner as the base station.

On the other hand, when the PDSCH does not satisfy the predetermined condition, the determining unit 22 may determine an HPN allocated to the PDSCH based on an HPN field in the DCI.

It can be seen that, with the above method, base station and UE according to the first embodiment of the present disclosure, a redundant field in DCI may be selectively used to notify the HPN allocated to the PDSCH, instead of adding a new field or bit. Thereby, 8 or more HARQ processes can be supported without increasing signaling overhead and power consumption.

Second Embodiment

A second embodiment according to the present disclosure may be described below. In the second embodiment of the present disclosure, a base station may allocate, for example, 10 HARQ processes to a PDSCH transmitted to a UE. Also, in the second embodiment, in addition to HPN fields in DCI, a redundant field in the DCI can be selectively used to represent an HPN allocated to the PDSCH.

Figure 7:
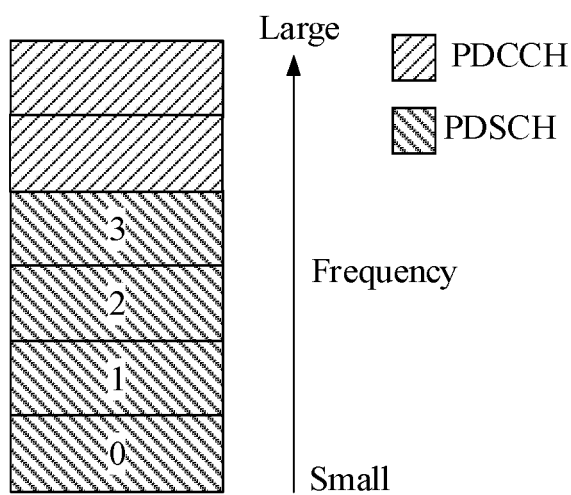
FIG. 7 is a schematic diagram illustrating allocation of a frequency resource block to a PDCCH and a PDSCH.

In particular, in an eMTC system, PDCCHs and PDSCHs may be transmitted in different frequency bands (narrowband). However, to use 8 or more HARQ processes, the PDCCHs and PDSCHs transmitted in at least 6 (=10−2−1−1) subframes should be in the same frequency band so that they can be received simultaneously. As illustrated in FIG. 7, the frequency band of the eMTC system may include, for example, 6 frequency resource blocks, and transmission of the PDCCHs needs to occupy at least 2 frequency resource blocks, so the PDSCHs may be transmitted in at most 4 frequency resource blocks, which means that only 4 (=ceil (log 2(4*(4+1)/2)) bits are used to indicate the frequency resource blocks allocated to the PDSCHs. In this case, 1 bit of the resource allocation field becomes a redundant bit since there are 5 bits in the resource allocation field. Therefore, an HPN greater than 8 may be allocated to at least one of the PDSCHs transmitted in the 6 subframes, and the HPN may be represented with an HPN field and the redundant bit in the resource allocation field. It should be noted that any bit (e.g., the most significant bit, the least significant bit, or some bit in the middle) in the resource allocation field may be predefined as the redundant bit.

Incidentally, when resource allocation is performed, the base station may allocate frequency resources in different manners for different PDSCHs. For a PDSCH transmitted in a frequency band different from a PDCCH, the base station may allocate resources to the PDSCH in a conventional manner. On the other hand, when a PDSCH is transmitted in the same frequency band as a PDCCH, the base station may allocate resources to the PDSCH in the remaining resource blocks of the frequency band in addition to frequency resource blocks allocated to the PDCCH. For example, the base station may add indexes to the remaining resource blocks in ascending order of frequency, as illustrated in FIG. 7, then allocate one of the frequency resource blocks to the PDSCH with the resource allocation method of type 2 specified in the 3GPP standard, and indicate the positions of the frequency resource blocks allocated to the PDSCH with 4 bits of the resource allocation field. Of course, according to the requirements, the base station may also allocate the remaining one or more frequency resource blocks to the PDSCH in any manner or in a specific manner, and indicate the positions of the frequency resource blocks allocated to the PDSCH with 4 bits of the resource allocation field. Furthermore, after the allocation of the resource, the base station may set a band indicator field of the DCI, which is transmitted to the UE, associated with the PDSCH, such that the field indicates the transmission band of the PDSCH.

Figure 8:
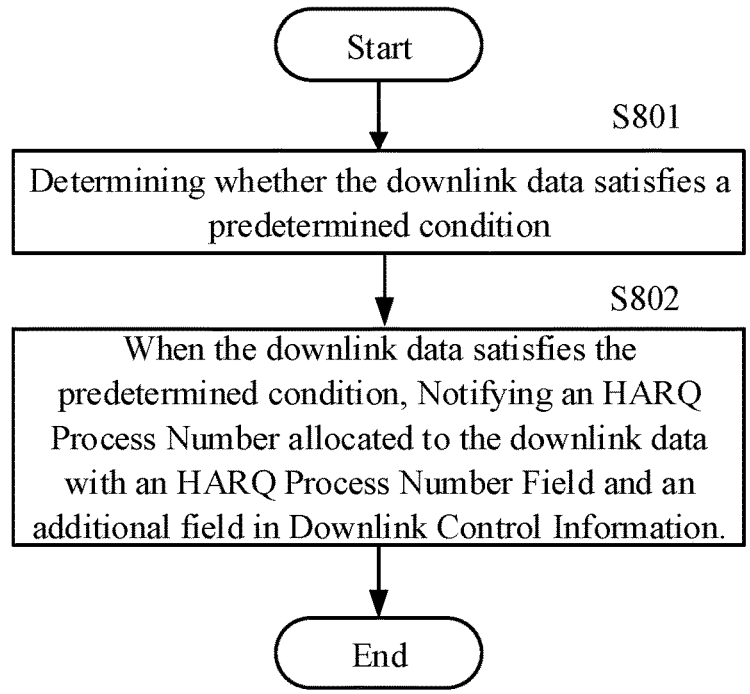
FIG. 8 is a flow chart illustrating a method for notifying an HARQ process number allocated to downlink data according to a second embodiment of the present disclosure.

A method for notifying an HPN allocated to a PDSCH according to the second embodiment of the present disclosure will be described below with reference to FIG. 8, which may be executed at a base station. The various steps illustrated in FIG. 8 are mostly the same as those illustrated in FIG. 2, with the difference that the predetermined conditions and the additional fields used are different from each other. For the sake of simplicity, the same portions of the second embodiment as those of the first embodiment will not be repeated herein.

As illustrated in FIG. 8, at step S801, whether the PDSCH satisfies a predetermined condition may be determined. In this embodiment, the predetermined condition means that the transmission band of the PDSCH is the same as the transmission band of DCI (i.e., the transmission band of a PDCCH carrying the DCI). In particular, since the base station may determine the transmission band of the PDSCH and the transmission band of the PDCCH, for example, based on the factors such as channel quality, the base station may compare the transmission bands of the PDSCH and PDCCH to determine whether they are in the same frequency band (e.g., in narrowband), and thereby determine whether the PDSCH satisfies the above predetermined condition.

Next, at step S802, when the PDSCH satisfies the predetermined condition, an HPN allocated to the PDSCH may be notified with an HPN field and an additional field in DCI.

In particular, as described above, when the transmission band of the PDSCH is the same as the transmission band of the DCI, at least 1 bit of a resource allocation field in the DCI indicating frequency resources allocated to the PDSCH becomes a redundant bit, and any bit of the resource allocation field may be predefined as the redundant bit (the predetermined bit). Therefore, the resource allocation field may be used as an additional field for representing and notifying the HPN allocated to the PDSCH, i.e., both the HPN field and the resource allocation field are used to represent and notify the HPN allocated to the PDSCH. In particular, the HPN allocated to the PDSCH may be notified with a value obtained by combining the HPN field and the predetermined bit in the resource allocation field. For example, a 1-bit A' of the resource allocation field and a 3-bit BBB of the HPN field may be cascaded as an A'BBB, such that HPN#0-HPN#7 may be represented when A'=0 and HPN#8-HPN#15 may be represented when A'=1. It should be appreciated that the manner of combining the HPN field and the above predetermined bit may be flexibly selected according to actual needs. For example, the predetermined bit may be the most significant bit of the bit string of the combined field as described above, or may be the least significant bit or some bit in the middle of the bit string of the combined field.

On the other hand, when it is determined that the PDSCH does not satisfy the predetermined condition, i.e., the transmission band of the PDSCH is different from the transmission band of the DCI, it is possible that all bits of the resource allocation field will be used to indicate the positions of the frequency resources allocated to the PDSCH as described above, and thereby there is no redundant bit. In this case, the HPN allocated to the PDSCH is notified with only an HPN field in the DCI. In this case, the HPN field may represent HPN#0-HPN#7.

A method for determining an HPN allocated to downlink data (also taking a PDSCH as an example) according to the second embodiment of the present disclosure will be described below with reference to FIG. 9. The method may be executed at a UE.

Figure 9:
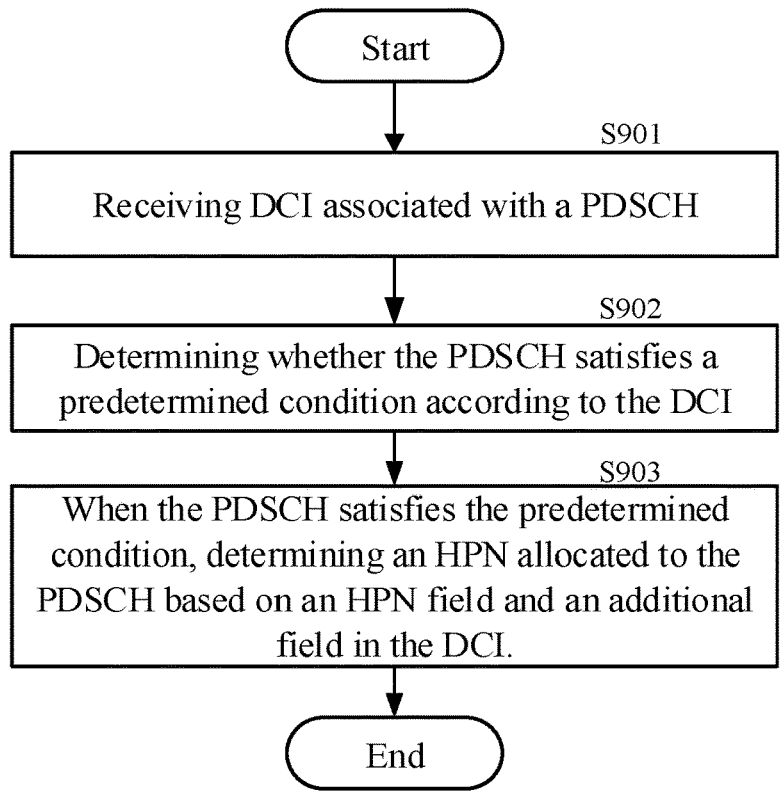
FIG. 9 is a flow chart illustrating a method for determining an HARQ process number allocated to downlink data according to the second embodiment of the present disclosure.

As illustrated in FIG. 9, at step S901, downlink control information (DCI) associated with the PDSCH is received. In particular, a PDCCH (mPDCCH) transmitted from a base station used to schedule the PDSCH may be received, and the DCI may be extracted from the PDCCH.

Next, at step S902, whether the PDSCH satisfies a predetermined condition is determined according to the DCI. In this embodiment, the predetermined condition means that the transmission band of the PDSCH indicated by the DCI is the same as the transmission band of the DCI (i.e., the transmission band of a PDCCH carrying the DCI). In particular, the DCI transmitted by the base station includes a frequency band indicator field indicating the transmission band of the PDSCH. Furthermore, the base station may signal the UE of the transmission band of the PDCCH in advance, such as resource control (RRC) signaling. Therefore, the UE may read the frequency band indicator field in the DCI to determine the transmission band of the PDSCH, and compare it with the transmission band of the PDCCH notified by the base station to determine whether the transmission band of the PDSCH is the same as the transmission band of the DCI, and thereby determine whether the PDSCH satisfies the predetermined condition.

Next, at step S903, when the PDSCH satisfies the predetermined condition, an HPN allocated to the PDSCH may be determined based on an HPN field and an additional field in DCI. As described above, when the PDSCH satisfies the predetermined condition, i.e., the transmission band of the PDSCH is the same as the transmission band of the DCI, at least 1 bit of a resource allocation field in the DCI is redundant, such that the base station may represent the HPN allocated to the PDSCH with the HPN field and the resource allocation field. That is, the additional field is the resource allocation field in the DCI, and more specifically, is the predetermined bit in the resource allocation field. Accordingly, on the UE side, the HPN allocated to the PDSCH may be determined based on the HPN field and the additional field in the DCI. For example, the HPN field and the predetermined bit in the resource allocation field may be combined, and the HPN allocated to the PDSCH may be determined based on the combined value. The manner of combining the HPN field and the predetermined bit in the resource allocation field may be, for example, pre-defined between the UE and the base station, or signaled to the UE by the base station such that the UE may combine the fields in the same manner as the base station.

On the other hand, when the PDSCH does not satisfy the above predetermined condition, an HPN allocated to the PDSCH may be determined based on an HPN field in the DCI. In particular, when the transmission band of the PDSCH is different from the transmission band of the DCI, the HPN allocated to the PDSCH is represented by the base station using only an HPN field in the DCI, as described above, and therefore the HPN allocated to the PDSCH may be determined in the UE by reading the HPN.

A base station according to the second embodiment of the present disclosure will be described below with reference to FIG. 10, which may execute the method described above with reference to FIG. 9. The same content as the above method will not be described here to avoid repetition.

Figure 10:
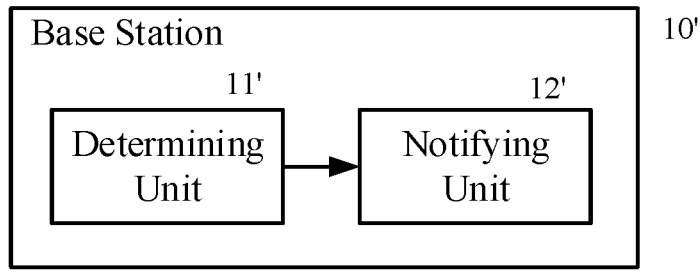
FIG. 10 is a block diagram illustrating a base station according to the second embodiment of the present disclosure.

As illustrated in FIG. 10, the base station 10' includes a determining unit 11' and a notifying unit 12'. It should be noted that only two units closely related to the present disclosure in the base station are illustrated herein for the sake of simplicity, but this is merely illustrative. The base station may further include other units as needed.

The determining unit 11' may determine whether the PDSCH satisfies a predetermined condition. In this embodiment, the predetermined condition means that the transmission band of the PDSCH is the same as the transmission band of the DCI (i.e., the transmission band of a PDCCH carrying the DCI). In particular, the base station may determine the transmission band of the PDSCH and the transmission band of the PDCCH, for example, according to factors such as channel quality, the determining unit 11' may compare the transmission bands of the PDSCH and PDCCH to determine whether they are in the same frequency band (e.g., in narrowband), and thereby determine whether the PDSCH satisfies the above predetermined condition.

The notifying unit 12' may notify an HPN allocated to the PDSCH with an HPN field and an additional field in the DCI when the PDSCH satisfies the predetermined condition.

In particular, as described above, when the transmission band of the PDSCH is the same as the transmission band of the DCI, at least 1 bit of a resource allocation field in the DCI indicating frequency resources allocated to the PDSCH becomes a redundant bit. Therefore, the notifying unit 12' may use the resource allocation field as an additional field for representing and notifying the HPN allocated to the PDSCH, i.e., both the HPN field and the resource allocation field are used to represent and notify the HPN allocated to the PDSCH. In particular, the notifying unit 12' may notify the HPN allocated to the PDSCH with a value obtained by combining the HPN field and the above predetermined bit in the resource allocation field.

On the other hand, when it is determined that the PDSCH does not satisfy the predetermined condition, i.e., the transmission band of the PDSCH is different from the transmission band of the DCI, the notifying unit 12' may notify the HPN allocated to the PDSCH with an HPN field in the DCI.

A UE according to the second embodiment of the present disclosure will be described below with reference to FIG. 11. The UE may execute the method described above with reference to FIG. 9. The same content as the above method will not be described here to avoid repetition.

Figure 11:
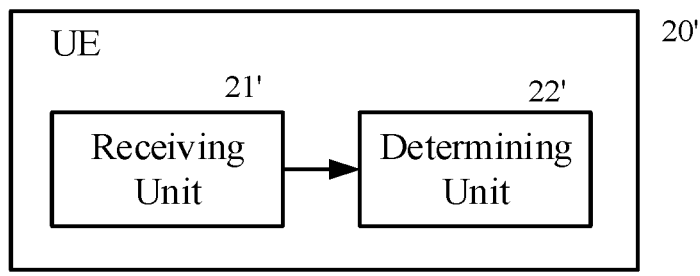
FIG. 11 is a block diagram illustrating a UE according to the second embodiment of the present disclosure.

As illustrated in FIG. 11, the UE 20' includes a receiving unit 21' and a determining unit 22'. It should be noted that only two units closely related to the present disclosure in the UE are illustrated herein for the sake of simplicity, but this is merely illustrative. The UE may further include other units as needed.

The receiving unit 21' may receive downlink control information (DCI) associated with the PDSCH. In particular, the receiving unit 21' may receive a PDCCH (mPDCCH), which is used to schedule the PDSCH, transmitted from the base station, and extract the DCI from the PDCCH.

The determining unit 22' may determine whether the PDSCH satisfies a predetermined condition according to the DCI. In this embodiment, as described above, the predetermined condition means that the transmission band of the PDSCH indicated by the DCI is the same as the transmission band of the DCI. In particular, The determining unit 22' may read a frequency band indicator field in the DCI to determine the transmission band of the PDSCH, and compare it with the transmission band of the PDCCH notified by the base station to determine whether the transmission band of the PDSCH is the same as the transmission band of the DCI, and thereby determine whether the PDSCH satisfies the predetermined condition.

Furthermore, when the PDSCH satisfies the predetermined condition, the determining unit 22' may determine an HPN allocated to the PDSCH based on an HPN field and an additional field in DCI. As described above, when the PDSCH satisfies the predetermined condition, i.e., the transmission band of the PDSCH is the same as the transmission band of the DCI, at least 1 bit of a resource allocation field in the DCI is redundant, such that the base station may represent the HPN allocated to the PDSCH with the HPN field and the resource allocation field. That is, the additional field is the resource allocation field in the DCI, and more specifically, is the predetermined bit in the resource allocation field. Accordingly, on the UE side, the determining unit 22' may determine the HPN allocated to the PDSCH based on the HPN field and the additional field in the DCI. For example, the determining unit 22' may combine the HPN field and the predetermined bit in the resource allocation field, and determine the HPN allocated to the PDSCH based on the combined value. The manner of combining the HPN field and the predetermined bit in the resource allocation field may be, for example, predefined between the UE and the base station, or signaled to the UE by the base station such that the UE may combine the fields in the same manner as the base station.

On the other hand, when the PDSCH does not satisfy the above predetermined condition, the determining unit 22' may determine the HPN allocated to the PDSCH based on an HPN field in the DCI.

It can be seen that, with the above method, base station and UE according to the second embodiment of the present disclosure, a redundant field in DCI may be selectively used to notify the HPN allocated to the PDSCH, without adding any new field or bit. Thereby, 8 or more HARQ processes can be supported without increasing signaling overhead and power consumption.

Third Embodiment

A third embodiment will be described below. In the third embodiment, a base station may allocate, for example, 10 HARQ processes to a PDSCH transmitted to a UE. Furthermore, in the third embodiment, an HPN allocated to the PDSCH (referred to as the current PDSCH for convenience of description) is not explicitly indicated by a combination of an additional field and an HPN field, but an HPN allocated to the current PDSCH is implicitly determined according to a reception state of a relevant PDSCH transmitted before the current PDSCH.

In particular, an HPN field in DCI has only 3 bits, so it can indicate up to 8 HPNs. To indicate more HPNs, one or more values represented by HPN field may be selected as predetermined values, and each predetermined value is used to indicate at least two HPNs. The number of selected predetermined values may be determined according to the difference between the number of HPNs needs to be indicated and 8. As an example, in a case that a system supports 10 HARQ processes so that 10 HPNs need to be indicated, "000" that can be represented by the HPN field may be selected as a first predetermined value to indicate HPN#0 and HPN#8, "001" may be selected as a second predetermined value to indicate HPN#1 and HPN#9, and each of the other values "010"~"111" that can be represented by the HPN field may indicate a corresponding HPN, as illustrated in TABLE 1 below. It should be appreciated that the manner of selecting predetermined values and allocating HPNs illustrated in TABLE 1 is merely illustrative, other manners of selecting and allocating may also be adopted as required. For example, more predetermined values may be selected, each of which indicates at least two HPNs, although actually the selection of 2 predetermined values is sufficient to indicate 10 HPNs. Alternatively, each predetermined value may indicate 3 or more HPNs, instead of being limited to 2 HPNs.

TABLE 1

| Values of an HPN field | The indicated HPN |
|---|---|
| 000 | HPN#0, HPN#8 |
| 001 | HPN#1, HPN#9 |
| 010~111 | HPN#2~HPN#7 |

In the above manner, when an HPN field in the DCI associated with the current PDSCH received by the UE is a predetermined value, the HPN field may represent at least two HPNs, which makes it difficult for the UE to determine which HPN is allocated to the current PDSCH. In order to avoid this problem, the base station may allocate an HPN to the current PDSCH to be transmitted to the UE according to a predetermined rule, and the UE may also determine the HPN allocated to the current PDSCH according to the rule. In this embodiment, the rule is based on a reception state of a PDSCH transmitted before the current PDSCH, as illustrated below.

When allocating an HPN to the current PDSCH, the base station may determine whether to allocate an HPN indicated by the above predetermined value to the current PDSCH firstly. If not, the base station may allocate a corresponding HPN to the current PDSCH in an existing manner, as described above, and the HPN will be indicated by a value other than the predetermined value that the HPN field can represent. On the other hand, when the base station is to allocate an HPN indicated by the above predetermined value to the current PDSCH, the base station may allocate the HPN to the current PDSCH with the method described below.

Next, a method for allocating an HPN to the current PDSCH according to the third embodiment of the present disclosure will be described below with reference to FIG. 12. Taking a case in which two HPNs are indicated with one predetermined value as an example herein, and the two HPNs are referred to as a first HPN and a second HPN respectively for convenience of illustration. However, it should be noted that the "first" and "second" used herein and in other portions are only for the purpose of identification, and not intended to represent the order, priority or the like of the corresponding objects.

Figure 12:
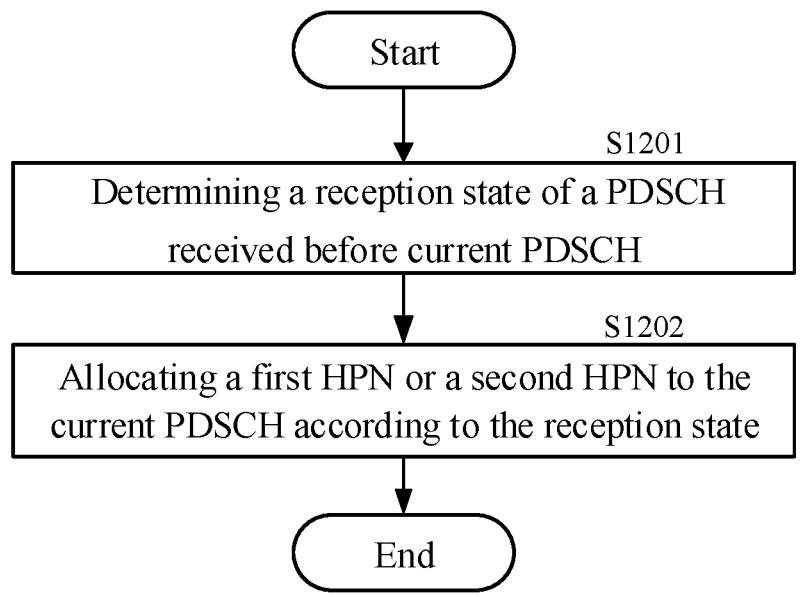
FIG. 12 illustrates a method for allocating an HARQ process number to current downlink data according to a third embodiment of the present disclosure.

As illustrated in FIG. 12, at step S1201, a reception state of a PDSCH (referred to as the previous PDSCH below for the convenience of description) transmitted before the current PDSCH is determined. At step S1202, the first HARQ process number or the second HARQ process number is then allocated to the current downlink data according to the reception state. As described above, the first HPN and the second HPN are represented by a predetermined value of an HPN field in DCI. The above method will be described below in conjunction with specific implementations.

In an implementation, the previous PDSCH may include a first PDSCH to which the first HPN is allocated and a second PDSCH to which the second HPN is allocated. In the example illustrated in TABLE 1, the first HPN is, for example, HPN#0 corresponding to the predetermined value "000", and the second HPN is, for example, HPN#8 corresponding to the predetermined value "000". The base station has transmitted the first PDSCH and the second PDSCH before transmitting the current PDSCH. The UE receives the first PDSCH and the second PDSCH, and transmits feedback information indicating a reception state of the two PDSCHs to the base station. The feedback information for each PDSCH may be, for example, positive acknowledgment (ACK) indicating that the PDSCH is successfully received or negative acknowledgment (NACK) indicating that the PDSCH is not successfully received. The base station may determine the reception state of the corresponding PDSCH on receiving the feedback information. Then, an HPN may be allocated to the current PDSCH in different manners according to the reception state of the first PDSCH and the second PDSCH.

In particular, when both the first PDSCH and the second PDSCH are successfully received, the first HPN may be allocated to the current PDSCH. This is because when both the first PDSCH and the second PDSCH are successfully received, both the first HPN and the second HPN may be released for transmission of the current PDSCH, in which case the smaller one of the first HPN and the second HPN may be allocated to the current PDSCH. Alternatively, in other embodiment, the greater one of the first HPN and the second HPN may be allocated to the current PDSCH, as long as it is predefined between the UE and the base station.

When neither the first PDSCH nor the second PDSCH is successfully received, the HPN in the first PDSCH and the second PDSCH for which the data transmission is completed firstly will be allocated to the current downlink data. This is because when neither the first PDSCH nor the second PDSCH is successfully received, the first PDSCH and the second PDSCH need to be retransmitted, which means that the current PDSCH may be one of the first PDSCH and the second PDSCH. In this case, the PDSCH which is completed in transmission first will be retransmitted first, which means that the current PDSCH is the PDSCH of the first PDSCH and the second PDSCH for which the transmission is completed first, and thus may be allocated with the HPN for which the data transmission is completed first.

When the first PDSCH is successfully received while the second PDSCH is not successfully received, the second HPN may be allocated to the current PDSCH. This is because the first PDSCH does not need to be retransmitted and the second PDSCH needs to be retransmitted, which means that the current PDSCH may be the retransmitted second PDSCH, and thus may be allocated with the second HPN.

In another implementation, the previous PDSCH may include a first PDSCH to which the first HPN is allocated. Also, the base station may determine a reception state of the first PDSCH according to feedback information for the first PDSCH. When the base station determines that the feedback information for the first PDSCH is not received, this means that the current PDSCH is to be transmitted in the case where a reception acknowledgement for the first PDSCH has not been received (i.e., when the round trip time of the first PDSCH has not expired). In this case, the unoccupied second HPN may be allocated to the current PDSCH.

In accordance with the above method, the base station may allocate an HPN to the current PDSCH to be transmitted to the UE according to a reception state of the previous PDSCH.

Next, a method for determining an HPN allocated to the current PDSCH according to the third embodiment of the present disclosure will be described below with reference to FIG. 13. The method may be executed at a UE. The same content as the above method described with reference to FIG. 12 will not be described here to avoid repetition.

Figure 13:
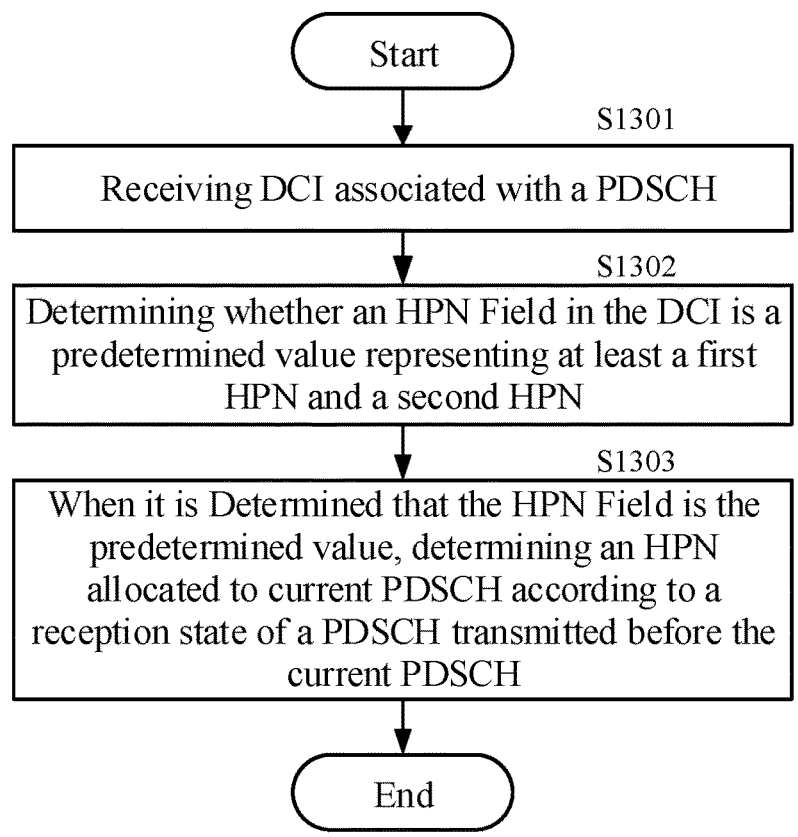
FIG. 13 illustrates a method for determining an HARQ process number allocated to current downlink data according to the third embodiment of the present disclosure.

As illustrated in FIG. 13, at step S1301, DCI associated with the current PDSCH is received. In particular, the DCI may be received by receiving a PDCCH associated with the current PDSCH. The manner in which the UE detects and receives PDCCHs is well known in the art, and will not be repeated herein.

At step S1302, it is determined whether an HPN field in the DCI is a predetermined value representing at least the first HPN and the second HPN. In particular, one or more values which the HPN field can represent may be selected as predetermined values as described above, and each predetermined value is used to indicate at least two HPNs. Therefore, when it is determined that the HPN field in the DCI is a predetermined value representing at least the first HPN and the second HPN, the HPN allocated to the current PDSCH may be one of at least the first HPN and the second HPN.

Next, at step S1303, when it is determined that the HPN field is a predetermined value, an HPN allocated to the current PDSCH is determined according to a reception state of a PDSCH (i.e., the previous PDSCH described above) transmitted before the current PDSCH.

In an implementation, the previous PDSCH may include a first PDSCH to which the first HPN is allocated and a second PDSCH to which the second HPN is allocated. The UE may determine whether it successfully receives the first PDSCH and the second PDSCH to confirm a reception state of the first PDSCH and the second PDSCH, and then determine an HPN allocated to the current PDSCH according to the reception state. In particular, when both the first PDSCH and the second PDSCH are successfully received, it may be determined that the first HPN is allocated to the current PDSCH. When neither the first PDSCH nor the second PDSCH is successfully received, it may be determined that the HPN for which the data transmission is completed first in the first PDSCH and the second PDSCH is allocated to the current downlink data. When the first PDSCH is successfully received while the second PDSCH is not successfully received, it may be determined that the second HPN is allocated to the current PDSCH.

In another implementation, the previous PDSCH may include a first PDSCH to which the first HPN is allocated. Also, the UE may determine whether the base station has not received a reception acknowledgement for the first PDSCH, for example, according to the round trip time of the PDSCH. If so, this means that the current PDSCH is transmitted in the case of the base station having not received the reception acknowledgement for the first PDSCH, and thus it may be determined that the unoccupied second HPN is allocated to the current PDSCH.

A base station according to the third embodiment of the present disclosure will be described below with reference to FIG. 14, which may execute the method described above with reference to FIG. 12. The same content as the above method will not be described here to avoid repetition.

Figure 14:
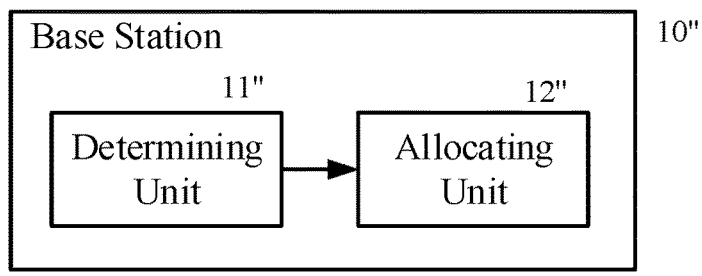
FIG. 14 is a block diagram illustrating a base station according to the third embodiment of the present disclosure.

As illustrated in FIG. 14, the base station 10" includes a determining unit 11" and an allocating unit 12". It should be noted that only two units closely related to the present disclosure in the base station are illustrated herein for the sake of simplicity, but this is merely illustrative. The base station may further include other units as needed.

The determining unit 11" may determine whether to allocate an HPN indicated by the predetermined value described above to the current PDSCH when allocating an HPN to the current PDSCH. If not, the allocating unit 12" may allocate a corresponding HPN to the current PDSCH in an existing manner, as described above, and the HPN will be indicated by a value other than the predetermined value that the HPN field can represent.

On the other hand, when the determining unit 11" determines that an HPN indicated by the above predetermined value is to be allocated to the current PDSCH, the allocating unit 12" may allocate the HPN to the current PDSCH with the method described below.

In particular, the determining unit 11" may determine a reception state of a PDSCH (referred to as the previous PDSCH below for the convenience of description) transmitted before the current PDSCH. The allocating unit 12" may then allocate the first HARQ process number or the second HARQ process number to the current downlink data according to the reception state. As described above, the first HPN and the second HPN are represented by a predetermined value of an HPN field in DCI. The above method will be described below in conjunction with specific implementations.

In an implementation, the previous PDSCH may include a first PDSCH to which the first HPN is allocated and a second PDSCH to which the second HPN is allocated. The determining unit 11" may determine a reception state of a corresponding PDSCH according to received feedback information for the first PDSCH and the second PDSCH. Then, the allocating unit 12" may allocate an HPN to the current PDSCH in different manners, according to the reception state of the first PDSCH and the second PDSCH. In particular, when both the first PDSCH and the second PDSCH are successfully received, the allocating unit 12" may allocate the first HPN to the current PDSCH. When neither the first PDSCH nor the second PDSCH is successfully received, the allocating unit 12" may allocate the HPN for which the data transmission is completed first in the first PDSCH and the second PDSCH to the current downlink data. When the first PDSCH is successfully received while the second PDSCH is not successfully received, the allocating unit 12" may allocate the second HPN to the current PDSCH.

In another implementation, the previous PDSCH may include a first PDSCH to which the first HPN is allocated. Also, the determining unit 11" may determine a reception state of the first PDSCH according to feedback information for the first PDSCH. When the base station determines that the feedback information for the first PDSCH is not received, this means that the current PDSCH is to be transmitted in the case where a reception acknowledgement for the first PDSCH has not been received (i.e., when the round trip time of the first PDSCH has not expired). In this case, the allocating unit 12" may allocate the unoccupied second HPN to the current PDSCH.

In accordance with the above method, the base station may allocate an HPN to the current PDSCH to be transmitted to the UE according to a reception state of the previous PDSCH.

Next, a UE according to the third embodiment of the present disclosure will be described below with reference to FIG. 15. The UE may execute the method described above with reference to FIG. 13. The same content as the above method will not be described here to avoid repetition.

Figure 15:
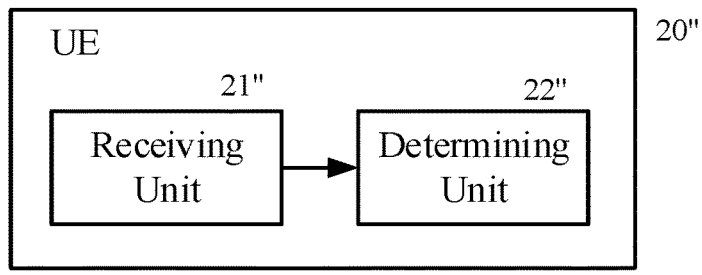
FIG. 15 is a block diagram illustrating a UE according to the third embodiment of the present disclosure.

As illustrated in FIG. 15, the UE 20" includes a receiving unit 21" and a determining unit 22". It should be noted that only two units closely related to the present disclosure in the UE are illustrated herein for the sake of simplicity, but this is merely illustrative. The UE may further include other units as needed.

The receiving unit 21" may receive DCI associated with the current PDSCH. In particular, the receiving unit 21" may receive the DCI by receiving a PDCCH associated with the current PDSCH. The manner in which the receiving unit 21" detects and receives PDCCHs is well known in the art, and will not be repeated herein.

The determining unit 22" may determine whether an HPN field in the DCI is a predetermined value representing at least the first HPN and the second HPN. In particular, one or more values those the HPN field can represent may be selected as predetermined values as described above, and each predetermined value is used to indicate at least two HPNs. Therefore, when it is determined that the HPN field in the DCI is a predetermined value representing at least the first HPN and the second HPN, the HPN allocated to the current PDSCH may be one of at least the first HPN and the second HPN.

When it is determined that the HPN field is a predetermined value, the determining unit 22" may determine an HPN allocated to the current PDSCH according to a reception state of a PDSCH (i.e., the previous PDSCH described above) transmitted before the current PDSCH.

In one implementation, the previous PDSCH may include a first PDSCH to which the first HPN is allocated and a second PDSCH to which the second HPN is allocated. The determining unit 22" may determine whether it successfully receives the first PDSCH and the second PDSCH to confirm a reception state of the first PDSCH and the second PDSCH, and then determine an HPN allocated to the current PDSCH according to the reception state. In particular, when both the first PDSCH and the second PDSCH are successfully received, the determining unit 22" may determine that the first HPN is allocated to the current PDSCH. When neither the first PDSCH nor the second PDSCH is successfully received, the determining unit 22" may determine that the HPN for which the data transmission is completed first in the first PDSCH and the second PDSCH is allocated to the current downlink data. When the first PDSCH is successfully received while the second PDSCH is not successfully received, the determining unit 22" may determine that the second HPN is allocated to the current PDSCH.

In another implementation, the previous PDSCH may include a first PDSCH to which the first HPN is allocated. Also, the determining unit 22" may determine whether the base station has not received a reception acknowledgement for the first PDSCH, for example, according to the round trip time of the PDSCH. If so, this means that the current PDSCH is transmitted in the case where the base station has not received the reception acknowledgement for the first PDSCH, and thus the determining unit 22" may determine that the second HPN is allocated to the current PDSCH.

It can be seen that, with the above method, base station and UE according to the third embodiment of the present disclosure, a redundant field in existing DCI may be used to notify the HPN allocated to the PDSCH, without adding any new field or bit. Thereby, 8 or more HARQ processes may be supported without increasing signaling overhead and power consumption.

It should be noted that the terms "include", "comprise" or any other variations thereof in the specification are intended to encompass a non-exclusive inclusion, such that a process, method, article or device comprising a series of elements includes not only those elements, but also other elements that are not explicitly listed, or elements inherent to such a process, method, article or device. In the absence of further restrictions, an element defined by the phrase "comprising a . . . " dose not exclude the presence of additional equivalent elements in the process, method, article or device comprising the said element.

Finally, it should be further noted that the series of processes described above include not only processes executed in time sequence in the order described herein, but also processes executed in parallel or separately rather than in time sequence.

Through the description of the above embodiments, those skilled in the art can clearly understand that the present disclosure may be implemented by means of software plus a necessary hardware platform, and certainly may also be implemented all by hardware. Based on such understanding, all or part of technical solutions of the present disclosure contributing to the background art may be embodied in the form of a software product that may be stored in a storage medium, such as a ROM/RAM, a magnetic disk, an optical disk or the like, including several instructions to enable a computer device (such as, a personal computer, a server, or a network device, etc.) to execute the methods described in various embodiments or portions of the embodiments of the present disclosure.

The present disclosure has been described in detail above. Specific examples are used herein to explain the principles and embodiments of the present disclosure, and the description of the above embodiments is intended to help understand the methods and its core ideas of the present disclosure; in the meantime, changes shall be made in the specific implementations and application scope for those skilled in the art with benefit of the present disclosure. In conclusion, the contents of this specification should not be constructed as limitation of the present disclosure.

The invention claimed is:

1. A user equipment, comprising:
    a processor;
    a storage medium having computer program instructions stored thereon, wherein the computer program instructions, when executed by the processor, perform processing of:
    receiving downlink control information associated with downlink data;
    determining, according the downlink control information, whether the downlink data satisfies a predetermined condition, and determining a hybrid automatic repeat request (HARQ) process number allocated to the downlink data based on an HARQ process number field and an additional field in the downlink control information when the downlink data satisfies the predetermined condition, wherein the additional field is a frequency hopping field in the downlink control information, and wherein the processor is configured to combine the HARQ process number field and the frequency hopping field, and determine the HARQ process number allocated to the downlink data based on a value of the combined field.

2. The user equipment according to claim 1, wherein the processor is further configured to determine the HARQ process number allocated to the downlink data based on the HARQ process number field in the downlink control information when the downlink data does not satisfy the predetermined condition.

3. The user equipment according to claim 1, wherein the predetermined condition is that a repetition number of the downlink data indicated by the downlink control information is equal to 1.

4. The user equipment according to claim 1, wherein the predetermined condition is that a transmission frequency band of the downlink data indicated by the downlink control information is the same as a transmission frequency band of the downlink control information.

5. The user equipment according to claim 4, wherein the additional field is a resource allocation field in the downlink control information, and wherein determining the HARQ process number allocated to the downlink data based on the HARQ process number field and the additional field in the downlink control information comprises:

combining the HARQ process number field and a predetermined bit in the resource allocation field; and determining the HARQ process number allocated to the downlink data based on a value of the combined field.

6. A user equipment, comprising:

a processor;

a storage medium having computer program instructions stored thereon, wherein the computer program instructions, when executed by the processor, perform processing of:

receiving downlink control information associated with current downlink data;

determining whether a hybrid automatic repeat request (HARQ) process number field in the downlink control information is a predetermined value representing at least a first HARQ process number and a second HARQ process number, and determining an HARQ number allocated to the current downlink data according to a reception state of downlink data transmitted before the current downlink data when it is determined that the HARQ process number field is the predetermined value, wherein when the downlink data transmitted before the current downlink data comprises first data to which the first HARQ process number is allocated and second data to which the second HARQ process number is allocated, the processor is configured to determine that the first HARQ process number is allocated to the current downlink data when both the first data and the second data are successfully received; or determine that an HARQ process number for which data transmission is completed firstly in the first data and the second data is allocated to the current downlink data when neither the first data nor the second data is successfully received; or determine that the second HARQ process number is allocated to the current downlink data when the first data is successfully received while the second data is not successfully received.

7. The user equipment according to claim 6, wherein when the downlink data transmitted before the current downlink data is the first data to which the first HARQ process number is allocated, the processor is configured to confirm that the second HARQ process number is allocated to the current downlink data, when a base station transmits the current downlink data in a case where the base station has not received an acknowledgment for the first data.

8. A base station, comprising:

a processor;

a storage medium having computer program instructions stored thereon, wherein the computer program instructions, when executed by the processor, perform processing of:

determining that whether downlink data satisfies a predetermined condition;

notifying a hybrid automatic repeat request (HARQ) process number allocated to the downlink data with an HARQ process number field and an additional field in downlink control information when the downlink data satisfies the predetermined condition, wherein the additional field is a frequency hopping field in the downlink control information, and wherein the processor is configured to notify the HARQ process number allocated to the downlink data with a value obtained by combining the HARQ process number field and the additional field.

9. The base station according to claim 8, wherein the processor is further configured to notify the HARQ process number allocated to the downlink data with the HARQ process number field in the downlink control information when the downlink data does not satisfy the predetermined condition.

10. The base station according to claim 8, wherein the predetermined condition is that a repetition number of the downlink data is equal to 1.

11. The base station according to claim 8, wherein the predetermined condition is that a transmission frequency band of the downlink data is the same as a transmission frequency band of the downlink control information.

12. The base station according to claim 11, wherein the additional field is a resource allocation field in the downlink control information, and wherein the processor is configured to notify the HARQ process number allocated to the downlink data with a value obtained by combining the HARQ process number field and a predetermined bit in the resource allocation field.

* * * * *